United States Patent
Onishi

(10) Patent No.: US 10,620,523 B2
(45) Date of Patent: Apr. 14, 2020

(54) IMAGE PROJECTION DEVICE

(71) Applicant: Panasonic Intellectual Property Management Co., Ltd., Osaka (JP)

(72) Inventor: Hideo Onishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/191,494

(22) Filed: Nov. 15, 2018

(65) Prior Publication Data

US 2019/0079378 A1    Mar. 14, 2019

Related U.S. Application Data

(63) Continuation of application No. PCT/JP2017/020560, filed on Jun. 2, 2017.

(30) Foreign Application Priority Data

Jun. 30, 2016   (JP) ................................ 2016-129785

(51) Int. Cl.
  *G03B 21/28*  (2006.01)
  *G02B 17/08*  (2006.01)
  (Continued)

(52) U.S. Cl.
  CPC ............. *G03B 21/28* (2013.01); *G02B 13/16* (2013.01); *G02B 17/08* (2013.01); *G02B 17/0816* (2013.01); *G03B 21/008* (2013.01)

(58) Field of Classification Search
  CPC ....... G03B 21/28; G03B 21/008; G02B 17/08
  (Continued)

(56) References Cited

U.S. PATENT DOCUMENTS 7,052,142 B2 *   5/2006   Gupta .................... G03B 21/20
                                              348/E5.137
7,869,122 B2 *   1/2011   Shafer ................ G02B 17/0812
                                                   359/365

(Continued)

FOREIGN PATENT DOCUMENTS

JP            2014-215527         11/2014

OTHER PUBLICATIONS

International Search Report of PCT application No. PCT/JP2017/020560 dated Aug. 29, 2017.

*Primary Examiner* — William C. Dowling
(74) *Attorney, Agent, or Firm* — Wenderoth, Lind & Ponack, L.L.P.

(57) ABSTRACT

An image projection device projects an image to a projection surface, and includes an image forming element, a refractive optical unit, and a reflective optical unit. The image forming element forms an image to be projected to the projection surface based on an image signal. The refractive optical unit has a refractive optical system including a plurality of lenses guiding light of the image toward the projection surface, the image being formed by the image forming element. The reflective optical unit includes a reflective optical system having a first mirror reflecting the light guided by the refractive optical system and a second mirror reflecting the light reflected by the first mirror toward the projection surface; and a blocking section including a blocking surface disposed at a position of blocking part of light generated in the refractive optical unit and passing through between the first mirror and the second mirror.

15 Claims, 9 Drawing Sheets

(51) Int. Cl.
*G02B 13/16* (2006.01)
*G03B 21/00* (2006.01)

(58) Field of Classification Search
USPC .......................................................... 353/99
See application file for complete search history.

(56) References Cited

U.S. PATENT DOCUMENTS

| | | | | |
|---|---|---|---|---|
| 8,804,234 B2* | 8/2014 | Shafer | ................ | G02B 17/0812 |
| | | | | 359/365 |
| 2010/0302516 A1* | 12/2010 | Rehn | ................. | G02B 17/0615 |
| | | | | 353/99 |
| 2017/0285451 A1* | 10/2017 | Uchida | ................ | G03B 21/147 |

* cited by examiner

IMAGE PROJECTION DEVICE

BACKGROUND

1. Technical Field

The present disclosure relates to an image projection device capable of preventing unnecessary light generated in the refractive optical system including two or more lenses from being projected to a projection surface.

2. Description of the Related Art

Recent years have seen projectors (image projection device) being used each of which enlarges an optical image formed by modulating light emitted from an illumination device, such as a light emitting diode (LED), in response to image information to project the image to a screen. For example, a projector in patent literature 1 includes a light-blocking material that is provided in the illumination optical system and blocks part of the circumference of the illumination light flux; and a light-blocking material adjusting means that adjusts the block material.

In the projector of patent literature 1, the above structure blocks part of the illumination light flux corresponding to the part that has passed through the projection optical system and is projected to the projection surface, out of the reflected light flux (i.e., the illumination light flux reflected near the modulating element (mirror element), which removes the flat light flux projected to the projection surface.

CITATION LIST

Patent Literature

PTL 1: Japanese Patent Unexamined Publication No. 2014-215527

SUMMARY

The above existing projector, however, has the following disadvantage. That is, the projector disclosed in patent literature 1 is capable of removing unnecessary light reflected near the mirror element as a modulating element; however, the projector is not intended, after light has passed through the illumination optical system, to remove unnecessary light generated in the refractive optical system including two or more lenses.

An objective of the present disclosure is to provide an image projection device that prevents unnecessary light generated in the refractive optical system including two or more lenses from being projected to a projection surface.

An image projection device according to the present disclosure projects an image to a projection surface. The image projection device includes an image forming element, a refractive optical unit, and a reflective optical unit. The image forming element forms an image to be projected to the projection surface based on an image signal. The refractive optical unit has a refractive optical system including a plurality of lenses guiding light of the image toward the projection surface, the image being formed by the image forming element. The reflective optical unit includes a reflective optical system having a first mirror reflecting the light guided by the refractive optical system and a second mirror reflecting the light reflected by the first mirror toward a projection surface; and a blocking section including the blocking surface disposed at a position of blocking part of light generated in the refractive optical unit and passing through between the first mirror and the second mirror.

An image projection device according to the present disclosure effectively prevents unnecessary light generated in the refractive optical system including two or more lenses from being projected to a projection surface.

DETAILED DESCRIPTION OF THE PREFERRED EMBODIMENTS

Hereinafter, a detailed description is made of exemplary embodiments referring to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description. Note that the applicant provides the accompanying drawings and the following descriptions for those skilled in the art to well understand the disclosure and does not intend that the drawings and the description limit the subjects described in the claims.

First Exemplary Embodiment

Projector (image projection device) 10 according to the first embodiment of the present disclosure is described using FIGS. 1 through 6B as follows.

Configuration of Projector 10

Figure 1:
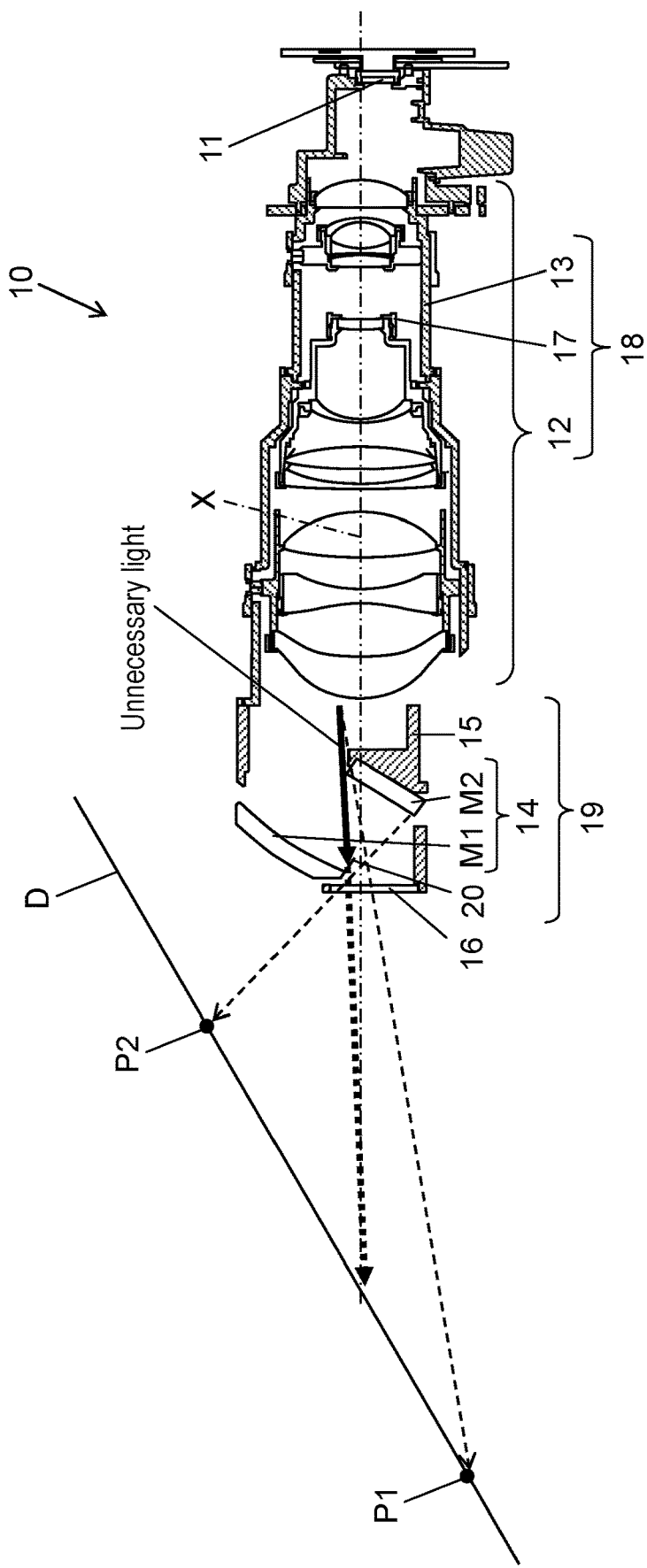
FIG. 1 is a sectional side view showing the overall configuration of a projector according to the first embodiment of the present disclosure.
Figure 2:
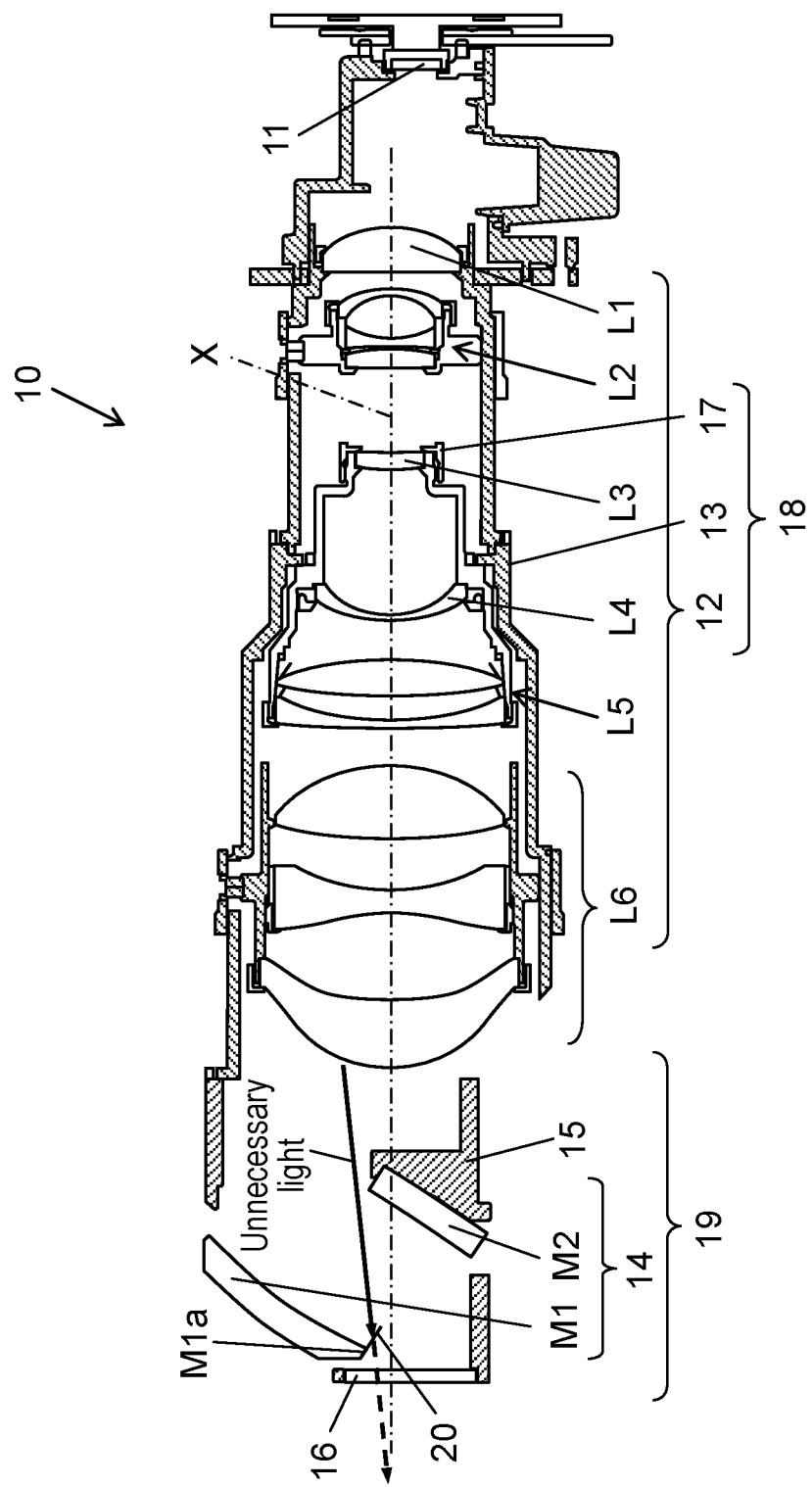
FIG. 2 is a sectional side view showing the configuration of the principal part of the projector of FIG. 1.
Figure 3:
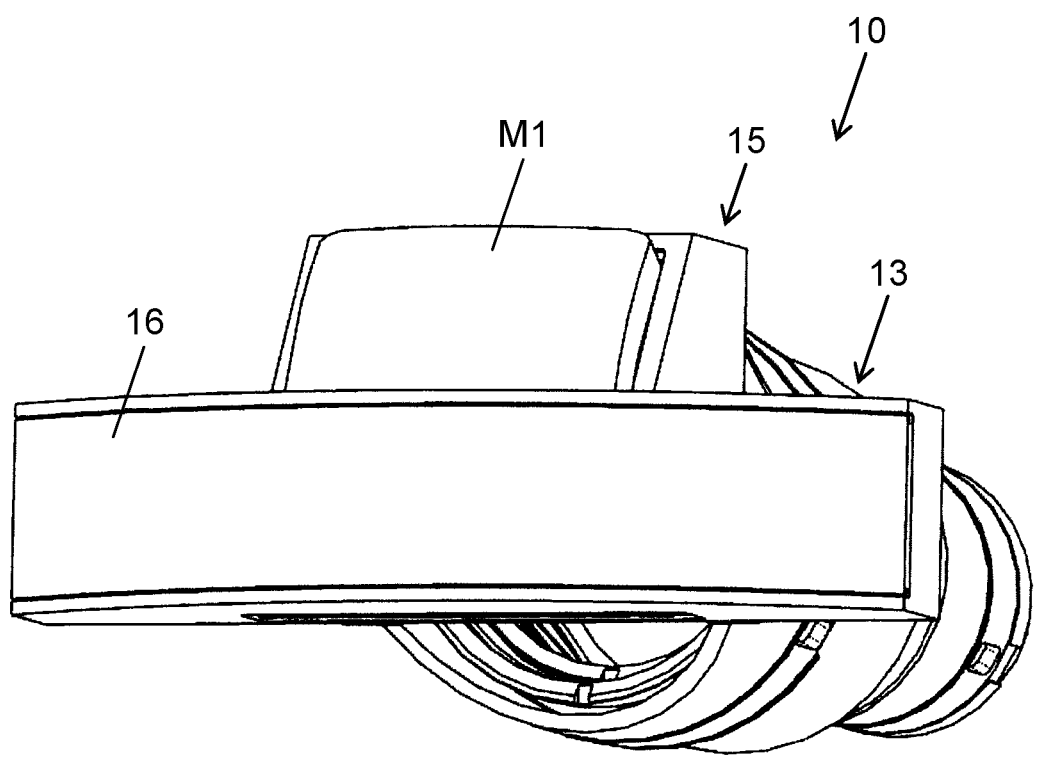
FIG. 3 is an overall perspective view of the projector of FIG. 1, viewed from the projection side.

As shown in FIG. 1, projector 10 according to this embodiment projects an image toward projection surface D based on an image signal received. As shown in FIG. 2, projector 10 includes digital micromirror device (DMD) 11 as an optical modulator element or an image forming element, refractive optical system 12, fastening frame 13, reflective optical system 14, mirror holder (first and second mirror holders) 15, cover glass 16, and aperture unit 17. Reflective optical system 14 has first mirror M1 and second mirror M2, and first mirror M1 has blocking sheet 20 (blocking section) disposed onto the bottom end surface of first mirror M1. Here, refractive optical system 12, fastening frame 13, and aperture unit 17 are included in refractive optical unit 18. Reflective optical system 14, mirror holder 15, cover glass 16, and blocking sheet 20 are included in reflective optical unit 19. Blocking sheet 20 prevents unnecessary light emitted from refractive optical unit 18 including refractive optical system 12 from passing through between first mirror M1 and second mirror M2 and from reaching projection surface D, where unnecessary light means light other than light of an image emitted from DMD 11 that does not contribute to forming an image to be projected to projection surface D.

In the configuration shown in FIG. 1, an illumination device (lighting unit) provided inside projector 10 is omitted; in an actual configuration, an illumination device is assumed to be provided inside the housing composing projector 10.

As shown in FIG. 1, projector 10 of the embodiment has projection surface D placed on optical axis X of first through sixth lens units L1 through L6 included in refractive optical system 12.

As shown in FIG. 1, projector 10 then projects various types of images into the region between first end P1 (i.e., the bottom end of projection surface D) and second end P2 (i.e., the top end) viewed from the side.

DMD 11, having two or more mirror elements on its front surface, modulates light emitted from the illumination device (not shown) to discharge the light toward first through sixth lens units L1 through L6 included in refractive optical system 12. DMD 11 then modulates the light based on an image signal received to form an image to be projected to projection surface D.

As shown in FIG. 2, refractive optical system 12 is composed of lens units L1 through L6 disposed along optical axis X. Then, refractive optical system 12 guides light of the image formed by DMD 11 along optical axis X toward reflective optical system 14. Refractive optical system 12 composes a projection optical system together with reflective optical system 14 (described later).

First lens unit L1, formed of one convex lens, is disposed closest to DMD 11 among the lens units composing refractive optical system 12. Second lens unit L2, formed of three lenses, is disposed downstream of first lens unit L1 on the optical path of light emitted from DMD 11. Third lens unit L3, formed of one convex lens, is disposed downstream of second lens unit L2 on the optical path. Fourth lens unit L4, formed of one concave lens, is disposed downstream of third lens unit L3 on the optical path. Fifth lens unit L5, formed of two lenses, is disposed downstream of fourth lens unit L4 on the optical path. Sixth lens unit L6, formed of three lenses, is disposed closest to the projection side (i.e., closest to reflective optical system 14) among the lens units composing refractive optical system 12.

As shown in FIG. 2, fastening frame 13 contains first through sixth lens units L1 through L6 so that optical axes X of the lenses agree with one another.

As shown in FIG. 2, reflective optical system 14, composed of two mirrors (first mirror M1 and second mirror M2), reflects light emitted from refractive optical system 12 to project the light to projection surface D. Reflective optical unit 19 is provided with blocking sheet 20 including a blocking surface substantially vertical to the reflection plane of first mirror M1 or second mirror M2, at a position of blocking part of light (unnecessary light) that has been generated in refractive optical unit 18 including refractive optical system 12 and has passed through between first mirror M1 and second mirror M2.

First mirror M1 reflects light emitted from sixth lens unit L6 disposed at the downmost-stream position of refractive optical system 12 and guides the light to second mirror M2. First mirror M1 has blocking sheet 20 disposed to end surface M1a (refer to FIG. 6A) of first mirror M1. As shown in FIG. 2, end surface M1a is the end surface closer to optical axis X viewed from the side. End surface M1a is also remote from refractive optical system 12 and at the same time close to the center of second mirror M2 viewed from the side. First mirror M1 has a recessed surface so as to face the upstream side (toward refractive optical system 12) on the optical path. Light reflected on this recessed surface is guided to second mirror M2.

Second mirror M2 reflects the light reflected on first mirror M1 and projects the image to projection surface D shown in FIG. 1. Here, second mirror M2 has a flat surface disposed so as to face the downstream side on the optical path. Then, the light reflected on this flat surface is projected to projection surface D, which causes an image to appear on projection surface D.

As shown in FIG. 2, mirror holder 15 is a housing that holds first mirror M1 and second mirror M2, and is connected to the part of fastening frame 13 close to the projection side. Mirror holder 15 holds cover glass 16 that transmits light to be projected to projection surface D.

Figure 5:
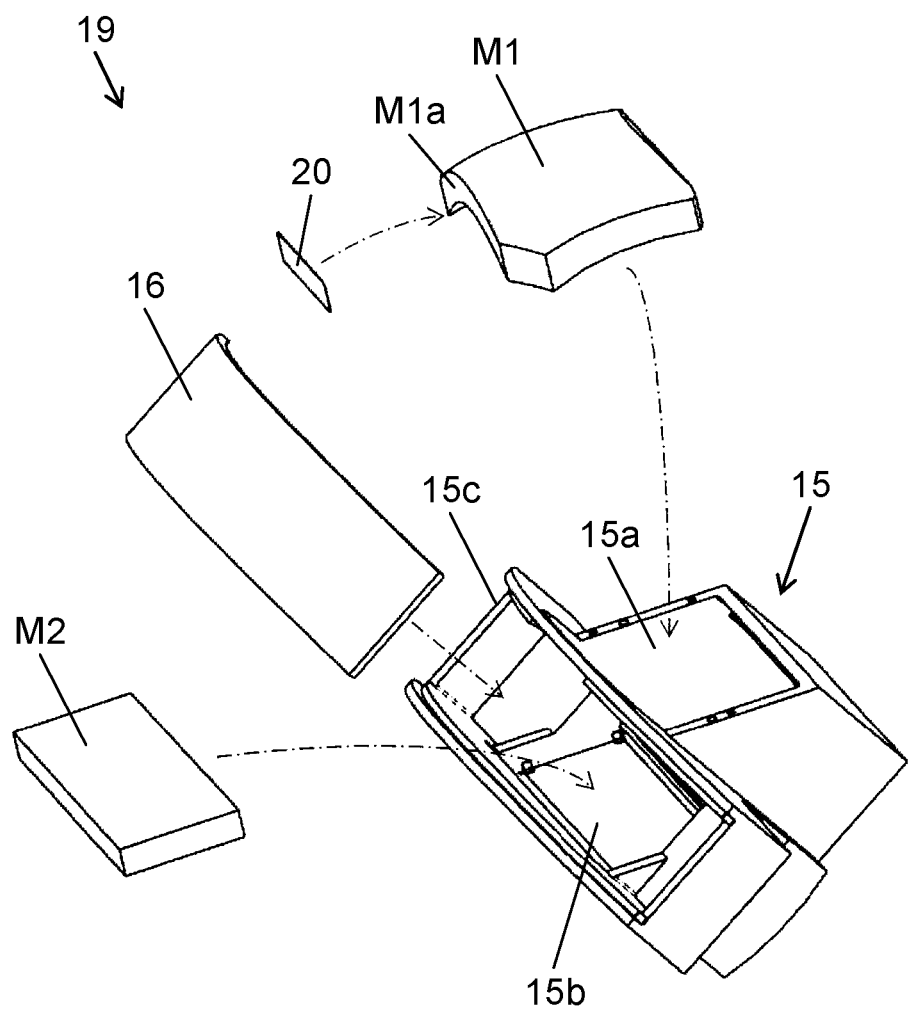
FIG. 5 is an exploded perspective view showing the configuration of the reflective optical unit including the reflective optical system of the projector of FIG. 3.

Note that mirror holder 15 has first mirror mounting section 15a on the top of mirror holder 15 on which first mirror M1 (with its recessed reflection plane facing inward) is fixed with blocking sheet 20 disposed to end surface M1a (refer to FIG. 5). Mirror holder 15 has second mirror mounting section 15b on the bottom of mirror holder 15 on which second mirror M2 (with its reflection plane facing upward) is fixed (refer to FIG. 5).

Then, mirror holder 15 has cover glass mounting section 15c on which cover glass 16 transmitting light is fixed, at the end of mirror holder 15, which is the downmost-stream side on the optical path (refer to FIG. 5). Cover glass 16 is an arc-shaped component formed of a light transmissive glass material, and is placed at the end of mirror holder 15 closest to the projection side.

Figure 4:
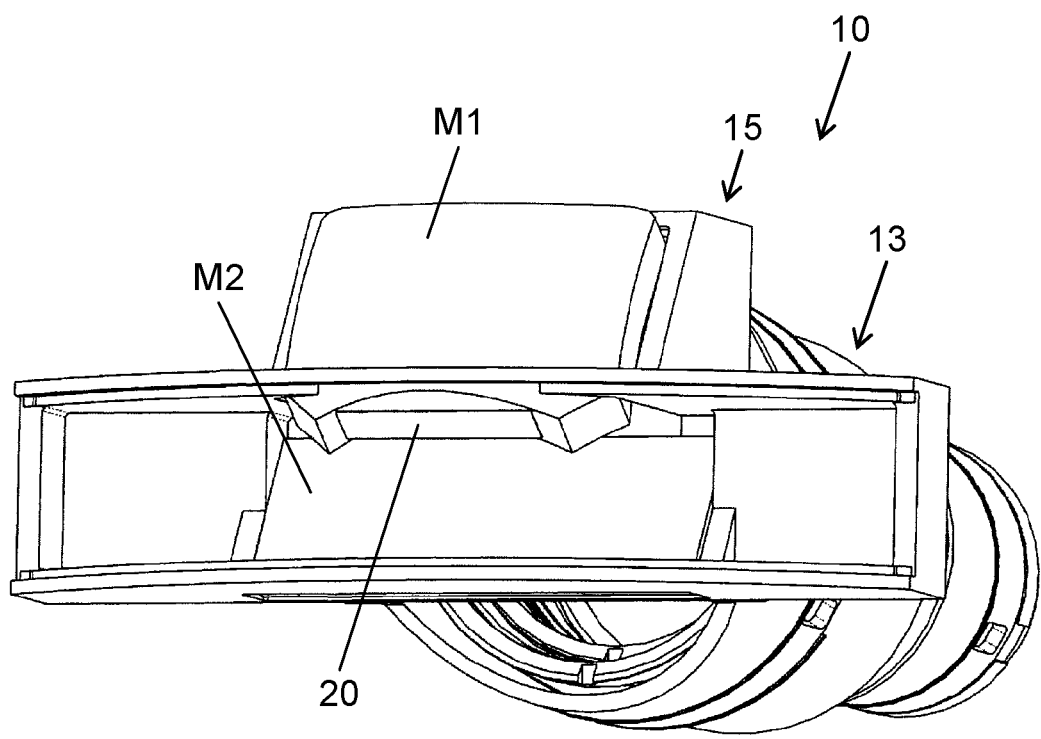
FIG. 4 is a perspective view of the projector of FIG. 3, with its cover glass removed.

As shown in FIG. 4, blocking sheet 20 is exposed that is disposed to second mirror M2 and end surface M1a of first mirror M1 in a state where cover glass 16 is removed.

Aperture unit 17, a component that adjusts the amount of light entering third through sixth lens units L3 through L6, is disposed close to the part of third lens unit L3 (described above) facing DMD 11.

Blocking sheet 20 is for example a polyester film with carbon black mixed therein and is well lightproof and antireflective. As shown in FIG. 2, blocking sheet 20 is disposed for blocking unnecessary light generated in fastening frame 13 (refractive optical unit 18) holding refractive optical system 12 so that the light is not projected to projection surface D. Concretely, blocking sheet 20 is disposed to end surface M1a of first mirror M1 included in reflective optical system 14 described above as shown in FIG. 5, which prevents unnecessary light from being projected to projection surface D.

As described above, the blocking surface of blocking sheet 20 is disposed along the direction substantially vertical to the reflection plane of first mirror M1 or second mirror M2.

Figure 6A:
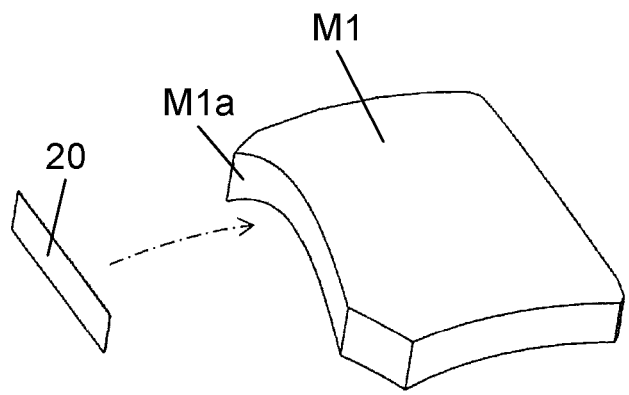
FIG. 6A is an exploded perspective view showing the configuration of the first mirror included in the reflective optical system of FIG. 5 and a blocking sheet disposed to the end surface of the first mirror.
Figure 6B:
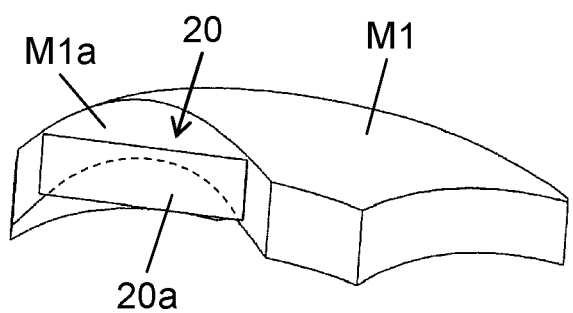
FIG. 6B is a perspective view showing the configuration of the blocking sheet disposed to the end surface of the first mirror included in the reflective optical system of FIG. 5.

As shown in FIG. 6A, end surface M1a of first mirror M1 on which blocking sheet 20 is disposed is formed of a single flat surface substantially arc-shaped. Hence, blocking sheet 20 is disposed onto flat end surface M1a. Thus, the part where light is blocked by blocking sheet 20 results in a shape enclosed by a substantially arc-shaped curved line and a straight line (chord).

In other words, first mirror M1, the reflection plane of which has a recessed form, has a substantially arc-shaped edge of end surface M1a. Hence, sheet-shaped blocking sheet 20 disposed to end surface M1a of first mirror M1 blocks unnecessary light at part (block region 20a) that does not face end surface M1a expanding off the substantially arc-shaped edge of end surface M1a. Block region 20a expands off end surface M1a of first mirror M1 toward second mirror M2, and elongates in this direction.

Here, unnecessary light generated in fastening frame 13 (refractive optical unit 18) refers to light such as reflected light generated at the edges of the frames of the lenses composing second lens unit L2, the edge of aperture unit 17, and the edge of the frame of third lens unit L3, for example. As shown in FIG. 1, such unnecessary light passes through between first mirror M1 and second mirror M2, and is undesirably projected to the display area between first end P1 and second end P2, in projection surface D placed on optical axis X of first through sixth lens units L1 through L6, viewed from the side.

Hence, projector 10 of the embodiment is provided with blocking sheet 20 placed for the component (first mirror M1) composing reflective optical system 14, in order to effectively block unnecessary light generated in fastening frame 13 holding refractive optical system 12.

In other words, projector 10 of the embodiment is provided with blocking sheet 20 on the optical path of unnecessary light that travels from refractive optical unit 18 through between first mirror M1 and second mirror M2 toward projection surface D, as shown in FIG. 1.

Even for projector 10, in which projection surface D is disposed on the extended line of optical axis X of lens units L1 through L6 composing refractive optical system 12, this configuration effectively prevents unnecessary light that has passed through between first mirror M1 and second mirror M2 from being projected to projection surface D.

As the result, projector 10, in which projection surface D placed on optical axis X of each lens of lens units L1 through L6 included in refractive optical system 12, blocks the path of unnecessary light passing through between first mirror M1 and second mirror M2.

The blocking surface of blocking sheet 20 needs to be placed at a position of blocking only unnecessary light and not blocking light of an image emitted from DMD 11. Accordingly, blocking sheet 20 is preferably placed so that the normal line at a freely chosen position in the reflection plane of first mirror M1 disposed is parallel to the blocking surface of blocking sheet 20. This structure prevents light of an image reflected on first mirror M1 from being blocked by blocking sheet 20.

Second Exemplary Embodiment

Projector (image projection device) 110 according to the second embodiment of the present disclosure is described using FIG. 7 as follows.

Figure 7:
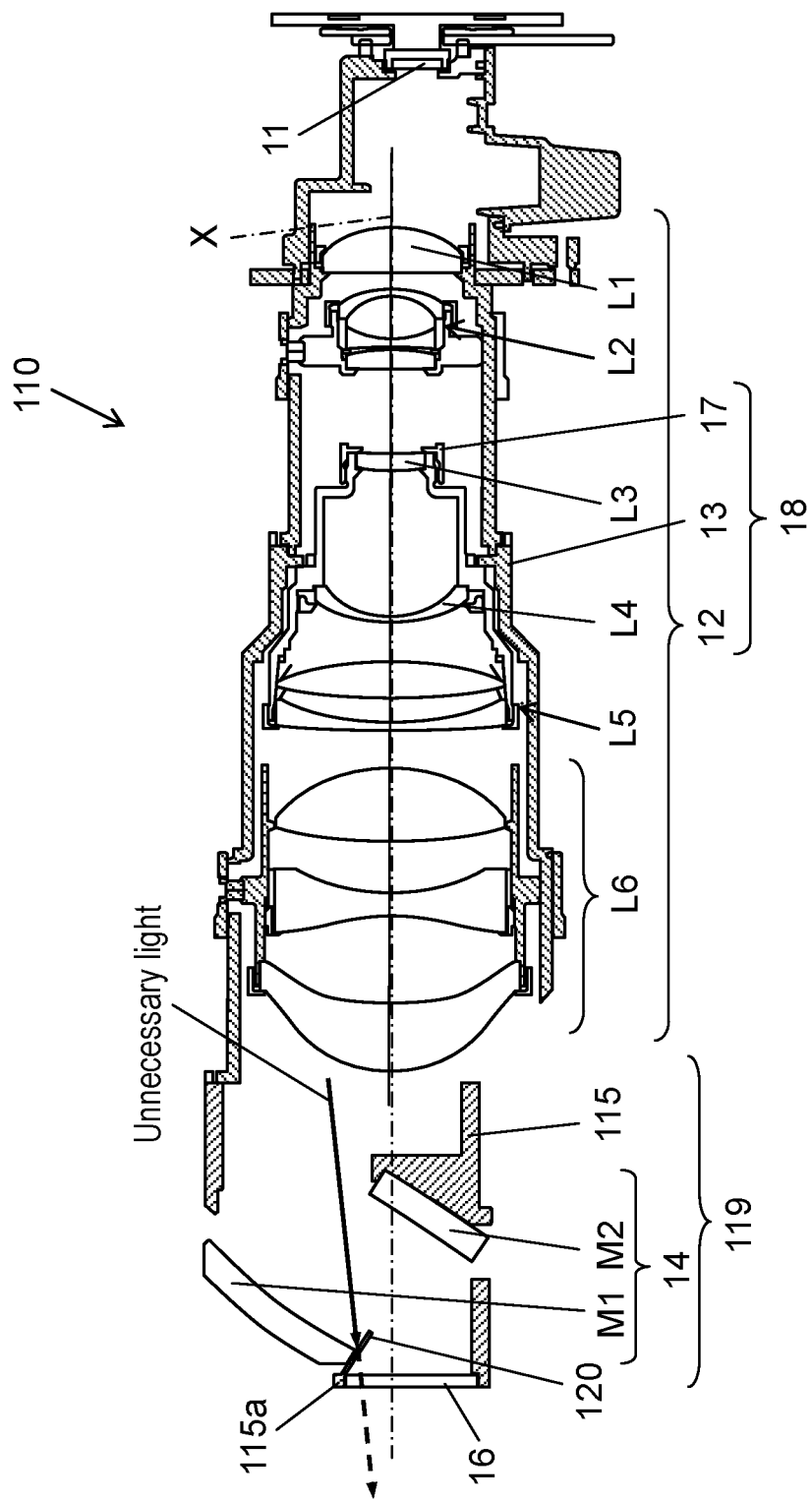
FIG. 7 is a sectional side view showing the configuration of a projector according to the second embodiment of the present disclosure.

As shown in FIG. 7, projector 110 of this embodiment is different from projector 10 of the first embodiment, in which blocking sheet 20 is disposed to end surface M1a of first mirror M1, in that blocking sheet 120 is disposed to mounting section 115a placed at the part of mirror holder (first and second mirror holding sections) 115 close to the first mirror holding section. Here, reflective optical system 14, mirror holder 115, cover glass 16, and blocking sheet 120 are included in reflective optical unit 119. However, a component other than the above-described is the same as that of projector 10 of the first embodiment, and thus is given the same reference mark and its detailed description is omitted for convenience of description.

As shown in FIG. 7, projector 110 of the embodiment includes blocking sheet (blocking section) 120 in order to block the optical path of unnecessary light generated in fastening frame 13 (refractive optical unit 18) holding refractive optical system 12. As shown in FIG. 7, blocking sheet 120 is disposed to part (mounting section 115a) of mirror holder 115 where first mirror M1 and cover glass 16 approximate each other. Mounting section 115a is placed at the part of mirror holder 115 close to the part (corresponding to the first mirror holding section) holding first mirror M1. Mounting section 115a is placed near end surface M1a of first mirror M1 and has a surface parallel to end surface M1a. Blocking sheet 120 is disposed to the surface parallel to this end surface M1a so as to extend toward second mirror M2.

Even for projector 110, in which projection surface D is disposed on the extended line of optical axis X of lens units L1 through L6 composing refractive optical system 12, this configuration effectively prevents part of light (unnecessary light) that has passed through between first mirror M1 and second mirror M2 from being projected to projection surface D, in the same way as the first embodiment. As the result, projector 110, in which projection surface D is placed on optical axis X of each lens of lens units L1 through L6 included in refractive optical system 12, blocks the path of unnecessary light passing through between first mirror M1 and second mirror M2 composing reflective optical system 14.

The blocking surface of blocking sheet 120 needs to be placed at a position of blocking only unnecessary light and not blocking light of an image emitted from DMD 11. Accordingly, blocking sheet 120 is preferably placed so that the normal line at a freely chosen position in the reflection plane of first mirror M1 held by mirror holder 115 disposed is parallel to the blocking surface of blocking sheet 120. This structure prevents light of an image reflected on first mirror M1 from being blocked by blocking sheet 120.

Third Exemplary Embodiment

Figure 8:
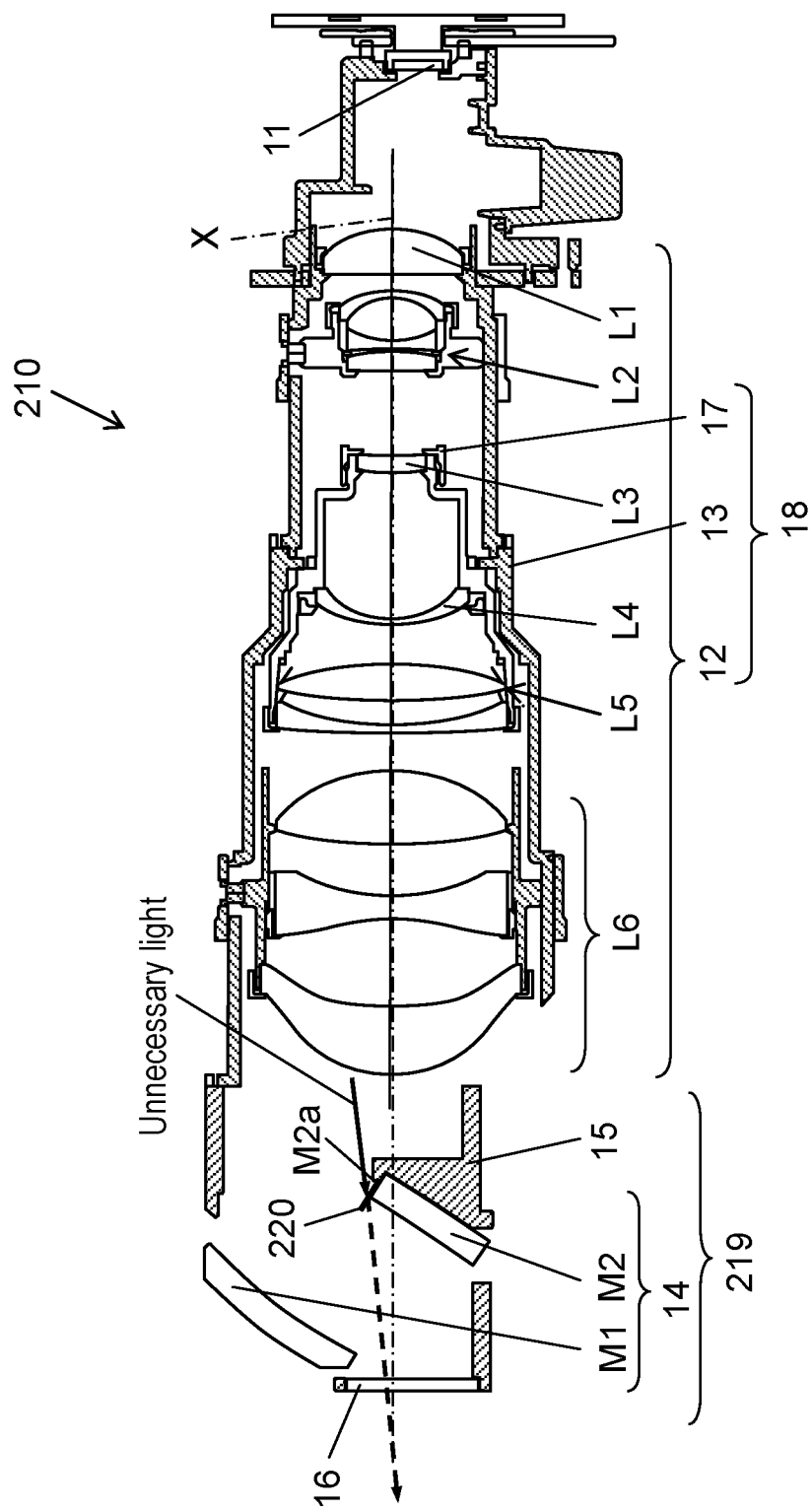
FIG. 8 is a sectional side view showing the configuration of a projector according to the third embodiment of the present disclosure.

Projector (image projection device) 210 according to the third embodiment of the present disclosure is described using FIG. 8 as follows. As shown in FIG. 8, projector 210 of this embodiment is different from projector 10 of the first embodiment, in which blocking sheet 20 is disposed to end surface M1a of first mirror M1, in that blocking sheet 220 is disposed to end surface M2a of second mirror M2. Here, reflective optical system 14, mirror holder 15, cover glass 16, and blocking sheet 220 are included in reflective optical unit 219. However, a component other than the above-described is the same as that of projector 10 of the first embodiment, and thus is given the same reference mark and its detailed description is omitted for convenience of description.

As shown in FIG. 8, projector 210 of the embodiment includes blocking sheet (blocking section) 220 in order to block the optical path of unnecessary light generated in fastening frame 13 (refractive optical unit 18) holding refractive optical system 12. As shown in FIG. 8, blocking sheet 220 is disposed to end surface M2a of second mirror M2 so as to extend toward first mirror M1. As shown in FIG. 8, end surface M2a is the end surface closer to optical axis X viewed from the side. End surface M1a is also the end surface close to refractive optical system 12 and at the same time closer to the center of second mirror M1 viewed from the side.

Even for projector 210, in which projection surface D is disposed on the extended line of optical axis X of lens units L1 through L6 composing refractive optical system 12, this configuration effectively prevents part of light (unnecessary light) that has passed through between first mirror M1 and second mirror M2 from being projected to projection surface D, in the same way as the first embodiment. As the result, projector 210, in which projection surface D is placed on optical axis X of each lens of lens units L1 through L6 included in refractive optical system 12, blocks the path of unnecessary light passing through between first mirror M1 and second mirror M2.

The blocking surface of blocking sheet 220 needs to be placed at a position of blocking only unnecessary light and not blocking light of an image emitted from DMD 11. Accordingly, blocking sheet 220 is preferably placed so that the normal line at a freely chosen position in the reflection plane of second mirror M2 disposed is parallel to the blocking surface of blocking sheet 220. This structure prevents light of an image reflected on first mirror M2 from being blocked by blocking sheet 220.

Fourth Exemplary Embodiment

Figure 9:
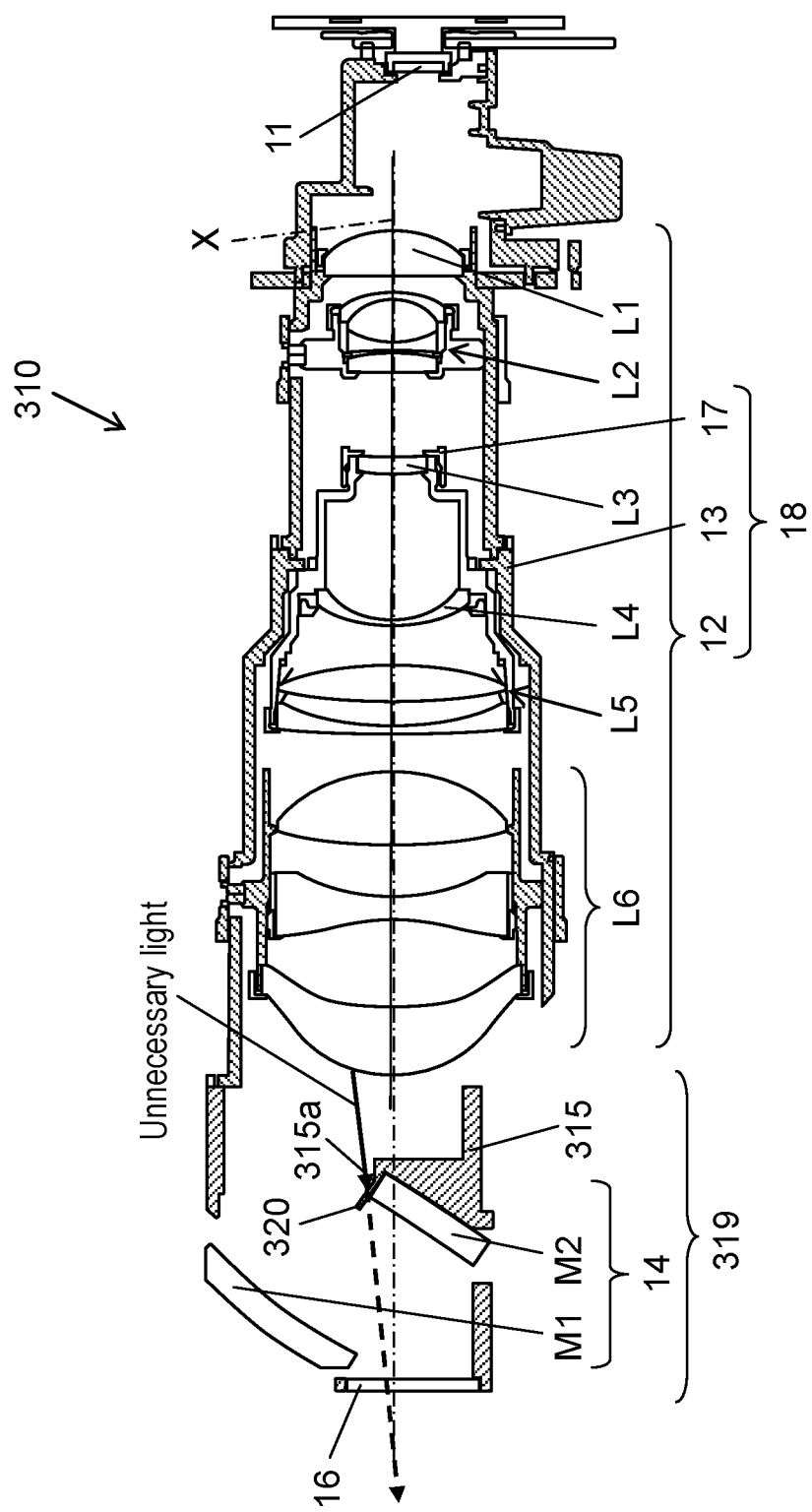
FIG. 9 is a sectional side view showing the configuration of a projector according to the fourth embodiment of the present disclosure.

Projector (image projection device) 310 according to the fourth embodiment of the present disclosure is described using FIG. 9 as follows. As shown in FIG. 9, projector 310 of this embodiment is different from projector 110 of the second embodiment, in which blocking sheet 120 is disposed to mounting section 115a placed at the part of mirror holder 115 close to the first mirror holding section, in that blocking sheet 320 is disposed to mounting section 315a placed at the part of mirror holder (first and second mirror holding sections) 315 close to second mirror holding section. Here, reflective optical system 14, mirror holder 315, cover glass 16, and blocking sheet 320 are included in reflective optical unit 319. However, a component other than the above-described is the same as that of projector 110 of the second embodiment, and thus is given the same reference mark and its detailed description is omitted for convenience of description.

As shown in FIG. 9, projector 310 of the embodiment includes blocking sheet (blocking section) 320 in order to block the optical path of unnecessary light generated in fastening frame 13 (refractive optical unit 18) holding refractive optical system 12. As shown in FIG. 9, blocking sheet 320 is disposed to part (mounting section 315a) of mirror holder 315 holding second mirror M2. Mounting section 315a is placed at the part of mirror holder 315 close to the part (corresponding to the second mirror holding section) holding second mirror M2. Mounting section 315a is placed near end surface M2a of second mirror M2 and has a surface parallel to end surface M2a. Blocking sheet 320 is disposed to this surface parallel to end surface M2a so as to extend toward first mirror M1.

Even for projector 310, in which projection surface D is disposed on the extended line of optical axis X of lens units L1 through L6 composing refractive optical system 12, this configuration effectively prevents part of light (unnecessary light) that has passed through between first mirror M1 and second mirror M2 from being projected to projection surface D, in the same way as the second embodiment. As the result, projector 310, in which projection surface D is placed on optical axis X of each lens of lens units L1 through L6 included in refractive optical system 12, is capable of blocking the path of unnecessary light passing through between first mirror M1 and second mirror M2 composing reflective optical system 14.

The blocking surface of blocking sheet 320 needs to be placed at a position of blocking only unnecessary light and not blocking light of an image emitted from DMD 11. Accordingly, blocking sheet 320 is preferably placed so that the normal line at a freely chosen position in the reflection plane of second mirror M2 held by mirror holder 315 disposed is parallel to the blocking surface of blocking sheet 320. This structure prevents light of an image reflected on second mirror M2 from being blocked by blocking sheet 320.

Other Exemplary Embodiments

Hereinbefore, the description is made of some embodiments of the disclosure; the disclosure is not limited to the above-described embodiments, but various types of modifications may be added within a scope that does not deviate from the gist of the present disclosure.

(A)

In the above-described embodiments, the description is made of an example where a polyester film containing carbon black is used as blocking sheet 20, 120, 220, or 320; however, the disclosure is not limited to the example. For example, the blocking sheet may be formed of another material as long as it is lightproof and antireflective.

(B)

In the above-described first through fourth embodiments, the description is made of an example where blocking sheet 20, 120, 220, or 320 is used as a blocking section for preventing unnecessary light from entering projection surface D; however, the disclosure is not limited to the example. For example, a plate-shaped or block-shaped component, besides a sheet-shaped one, may be used as a blocking section.

(C)

In the above-described second embodiment, the description is made of an example where blocking sheet 120 is disposed to part (mounting section 115a) of mirror holder 115 as a blocking section; however, the disclosure is not limited to the example. For example, the blocking section may be integrally molded as part of mirror holder 115. This case eliminates the need for a process of mounting the blocking sheet to the mirror holder, which reduces production costs.

Also in the fourth embodiment, the description is made of an example where blocking sheet 320 as a blocking section is disposed to part (mounting section 315a) of mirror holder 315; however, the disclosure is not limited to the example. For example, the blocking section may be integrally molded as part of mirror holder 315. This case also eliminates the need for a process of mounting the blocking sheet to the mirror holder, which reduces production costs.

(D)

In the above-described first through fourth embodiments, the description is made of an example where first mirror M1 and second mirror M2 are held by single mirror holder 15, 115, or 315; however, the disclosure is not limited to the example. For example, the first and second mirrors may be held by separate mirror holders.

(E)

In the above-described first through fourth embodiments, the description is made of an example where projector 10, 110, 210, or 310 has reflective optical system 14 including two mirrors (first mirror M1 and second mirror M2); however, the disclosure is not limited to the example. For example, each projector may have an optical system including three or more mirrors such as third and fourth mirrors, in addition to first mirror M1 and second mirror M2.

(F)

In the above-described first through fourth embodiments, the description is made of an example where projector 10, 110, 210, or 310 has refractive optical system 12 including first through sixth lens units L1 through L6; however, the disclosure is not limited to the example. For example, the configuration of the lenses included in the refractive optical system is not limited to that described in the above-described first through fourth embodiments, but the number of lenses, the types of lenses, and/or other conditions may be changed.

(G)

In the above-described first through fourth embodiments, the description is made of an example where projector 10, 110, 210, or 310 has single blocking sheet 20, 120, 220, or 320; however, the disclosure is not limited to the example. With a combination of the above-described first through fourth embodiments, two or more of blocking sheets 20, 120, 220, and 320 may be used. For example, with a combination of the first and third embodiments, the projector may be configured to include blocking sheet 20 disposed to end surface M1a of first mirror M1 and blocking sheet 220 disposed to end surface M2a of second mirror M2.

INDUSTRIAL APPLICABILITY

An image projection device of the present disclosure effectively prevents unnecessary light generated in the refractive optical system including two or more lenses from being projected to a projection surface, and thus is extensively applicable to various types of image projection devices.

What is claimed is:

1. An image projection device projecting an image to a projection surface, comprising:
    an image forming element forming an image to be projected to the projection surface based on an image signal;
    a refractive optical unit having a refractive optical system including a plurality of lenses guiding light of the image toward the projection surface, the image being formed by the image forming element; and
    a reflective optical unit including
        a reflective optical system having
            a first mirror reflecting the light guided by the refractive optical system and
            a second mirror reflecting the light reflected by the first mirror toward the projection surface; and
        a blocking section including a blocking surface disposed at a position of blocking part of light generated in the refractive optical unit and passing through between the first mirror and the second mirror.

2. The image projection device of claim 1, wherein the part of light is unnecessary light not contributing to forming the image to be projected to the projection surface.

3. The image projection device of claim 1, wherein the projection surface is on an optical axis of the plurality of lenses included in the refractive optical system.

4. The image projection device of claim 3, wherein the blocking section is disposed at an end of at least one of the first mirror and the second mirror, the end being close to the optical axis.

5. The image projection device of claim 4,
    wherein,
        for the blocking section disposed at the first mirror, the blocking section extends toward the second mirror, and
        for the blocking section disposed at the second mirror, the blocking section extend toward the first mirror.

6. The image projection device of claim 1, wherein the blocking surface is parallel to a normal line at a freely chosen position in a reflection plane of either one of the first mirror and the second mirror.

7. The image projection device of claim 6, wherein the blocking section is disposed to the first mirror.

8. The image projection device of claim 6,
    wherein the reflective optical unit further has a first mirror holding section holding the first mirror, and
    wherein the blocking section is disposed at the first mirror holding section.

9. The image projection device of claim 8, wherein the blocking section is integrated with the first mirror holding section.

10. The image projection device of claim 7, wherein the blocking section extends toward the second mirror.

11. The image projection device of claim 6, wherein the blocking section is disposed to the second mirror.

12. The image projection device of claim 6,
    wherein the reflective optical unit further has a second mirror holding section holding the second mirror, and
    wherein the blocking section is disposed at the second mirror holding section.

13. The image projection device of claim 12, wherein the blocking section is integrated with the second mirror holding section.

14. The image projection device of claim 11, wherein the blocking section extends toward the first mirror.

15. The image projection device of claim 1, wherein the blocking section has a shape of a sheet.

* * * * *